(12) United States Patent
Hill et al.

(10) Patent No.: US 10,934,196 B2
(45) Date of Patent: Mar. 2, 2021

(54) LAGOON-BASED WASTEWATER TREATMENT WITH DENITRIFICATION

(71) Applicant: Triplepoint Environmental LLC, Oak Park, IL (US)

(72) Inventors: Patrick D. Hill, Forest Park, IL (US); Braden J. Galbreath-O'Leary, Oak Park, IL (US)

(73) Assignee: Triplepoint Environmental LLC, Oak Park, IL (US)

( * ) Notice: Subject to any disclaimer, the term of this patent is extended or adjusted under 35 U.S.C. 154(b) by 0 days.

(21) Appl. No.: 16/545,140

(22) Filed: Aug. 20, 2019

(65) Prior Publication Data

US 2020/0062626 A1 Feb. 27, 2020

Related U.S. Application Data

(60) Provisional application No. 62/720,195, filed on Aug. 21, 2018.

(51) Int. Cl.
*C02F 3/30* (2006.01)
*C02F 1/00* (2006.01)
*C02F 101/16* (2006.01)

(52) U.S. Cl.
CPC ............ *C02F 3/302* (2013.01); *C02F 1/00* (2013.01); *C02F 2001/007* (2013.01); *C02F 2101/16* (2013.01); *C02F 2301/046* (2013.01)

(58) Field of Classification Search
CPC ...... C02F 3/302; C02F 1/00; C02F 2301/046; C02F 2101/16; C02F 2001/007
USPC ................................ 210/630, 621, 194, 196
See application file for complete search history.

(56) References Cited

U.S. PATENT DOCUMENTS

| 6,136,194 A | * | 10/2000 | Vogel | ......................... | C02F 3/00 |
| | | | | | 210/150 |
| 2011/0068058 A1 | * | 3/2011 | Sun | ......................... | B01D 61/08 |
| | | | | | 210/620 |

* cited by examiner

*Primary Examiner* — Nam X Nguyen
*Assistant Examiner* — Julia L. Wun
(74) *Attorney, Agent, or Firm* — Potomac Law Group, PLLC; Kenneth Fagin

(57) ABSTRACT

In a lagoon-based wastewater treatment process, reduction of total nitrogen in the product water is facilitated by including a denitrification process. In an initial phase of the overall process, raw wastewater is processed in a lagoon to reduce BOD5 and TSS. Nitrification occurs in the lagoon and/or in a distinct or separate nitrification reactor. At least a portion of product water that has been nitrified is mixed with a portion of raw, incoming wastewater, and the mixture is introduced into an anoxic region of the lagoon in a manner that promotes denitrification within the anoxic region of the lagoon.

6 Claims, 1 Drawing Sheet

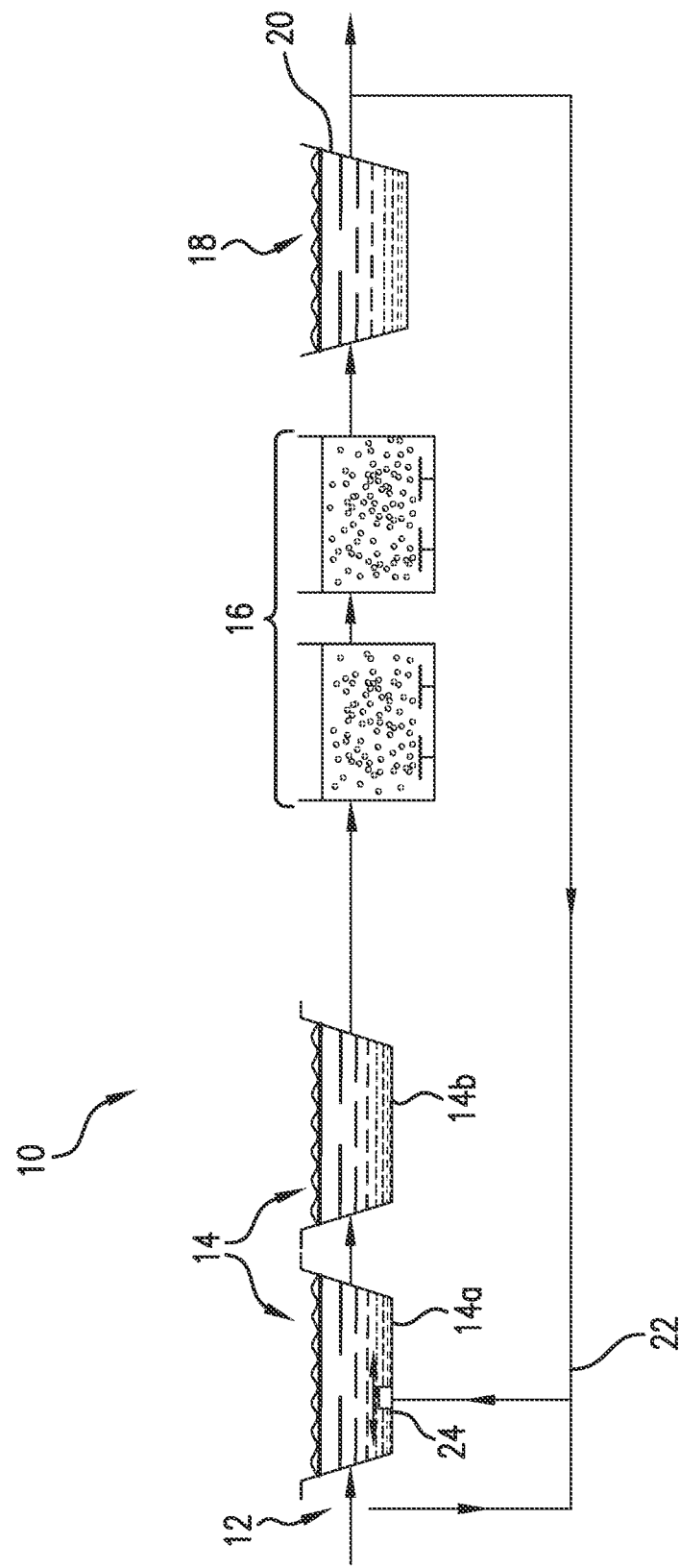

LAGOON-BASED WASTEWATER TREATMENT WITH DENITRIFICATION

CROSS-REFERENCE TO RELATED APPLICATIONS

This application is based on and claims the priority benefit of U.S. provisional application 62/720,195 filed Aug. 21, 2018, the contents of which are incorporated herein by reference.

BACKGROUND OF THE INVENTION

It is estimated that approximately one-third of all wastewater treatment facilities in the United States utilize a wastewater lagoon in some capacity during their treatment process. This means that there are more than 6,000 systems employing the use of wastewater lagoons in this country alone. That includes all fifty states, which translates to practically every American watershed, impacting the lives of millions of people nationwide. Lagoons, which can also be found in Canada and other parts of the world, became popular in the 1980's due to their simple design and low maintenance.

There are a number of different types of lagoon treatment processes, including facultative, anaerobic, and aerated or aerobic lagoons. Facultative lagoon systems are typically comprised of several shallow ponds, 4-6 feet deep, with a typical overall retention time of 120-180 days. With the absence of direct oxygen input, anaerobic and some aerobic bacteria break down the waste over a longer period of time. The clean effluent water can then be discharged either on a continuous basis or a periodic, controlled, basis. In controlled discharge systems, the water is stored in a separate storage lagoon and only discharged when water temperatures are likely to be warmer, typically spring (April and May) and fall (October and November) depending on the location of the facility and state regulations.

Aerated lagoons are typically deeper, 8-20 feet deep, and rely on either mechanical or diffused aeration for the supply of oxygen and mixing necessary to aerobically break down waste contaminants in the water. With typically 1-4 aeration cells, operated in series or parallel, aerobic lagoons generally have a retention time of anywhere between 20-40 days.

Properly designed lagoon systems can remove the common constituents found in a wastewater discharge permit, including Biochemical Oxygen Demand (BOD5) and Total Suspended Solids (TSS). However, ever stricter water quality standards being imposed by environmental regulators have already begun imposing strict standards for ammonia (NH3-N), nitrite+nitrate, and total nitrogen (TN) discharge levels on all lagoon systems. This poses a problem for owners of lagoon systems as they were never designed with the intent of meeting stringent ammonia and total-nitrogen discharge limits.

Meeting Total Nitrogen (TN) Limits is particularly challenging for lagoon owners. Total Nitrogen is comprised of the sum of Total Ammonia ($NH_3+NH_4^+$), Nitrite ($NO_2$), Nitrate ($NO_3$) and Organic Nitrogen. The first step to biologically lower TN is the process of nitrification, which is a two-step oxidation sequence that first oxidizes ammonia to yield nitrite ($NO_2$) and then, in a separate step, oxidizes nitrite to produce nitrate ($NO_3$) as shown in equations (1) and (2) below. This process is accomplished by fostering the growth of two types of bacteria, *Nitrosomonas* and *Nitrobacter*, often referred to as autotrophic nitrifiers.

$$2NH_4^+ + 3O_2 + Nitrosomonas \rightarrow 2NO_2^- + 4H^+ + 2H_2O \quad (1)$$

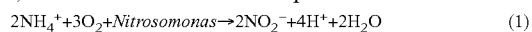

$$2NO_2^- + O_2 + Nitrobacter \rightarrow 2NO_2^- \quad (2)$$

A nitrification reactor for use in a Lagoon Biological Treatment System and Method (LBT) as disclosed, for example, in our U.S. Pat. No. 9,957,176 (incorporated by reference) is designed to foster the conditions for nitrifiers to grow by placing the reactor after BOD treatment has occurred in the upstream lagoon so the nitrifiers don't have to compete with heterotrophic BOD-consuming bacteria; by regulating temperature of the water (e.g., in winter) so that the nitrifiers don't go completely dormant; and by providing sufficient oxygen and mixing for rapid nitrification. This is a proven and effective method, with the lagoon systems with the LBT process discharging extremely low levels of ammonia year round.

As described by equations (1) and (2) above, nitrification converts one form of nitrogen (ammonia) into another (nitrate). Therefore, in order to remove total nitrogen (TN) from the wastewater, an additional step, known as denitrification, is required. In this additional step, nitrate is converted into nitrogen gas through the action of heterotrophic bacteria. As described by equation (3) below, the total denitrification reaction uses an electron donor, which can be provided by organic matter or a carbon source such as feces, sulfide, or methanol.

$$0.2NO_2^- + 1.2H^+ + e^- \rightarrow 0.1N_2 + 0.6H_2O \quad (3)$$

Under conditions of limited dissolved oxygen (DO), the nitrate reductase enzyme in the electron transport chain is introduced and helps to deliver hydrogen and electrons to nitrate (Metcalf & Eddy), ultimately producing molecular nitrogen ($N_2$) through a series of intermediate gaseous nitrogen oxide products.

In general, a significant challenge to accomplishing dentritrification in a lagoon-based system is that many of the conditions required for nitrification—such as low BOD, low heterotrophic bacteria, and high dissolved oxygen content—are antithetical to promoting denitrification, which requires significant heterotrophic bacteria, BOD to provide a carbon source, and low dissolved oxygen. Although this "conflict" in requirements creates a challenge in any biologically based wastewater treatment system, it is especially true in lagoon-based systems.

SUMMARY OF THE INVENTION

The disclosed system and method provide a process and associated apparatus that suitably utilizes either existing or new treatment lagoon infrastructure. In general, the method entails mixing effluent water—which has been processed in just a lagoon, per se, or also in a downstream nitrification reactor—with a portion of influent water, and introducing the blended water into the lower, oxygen-poor regions of the lagoon (e.g., the first cell in a multi-cell lagoon portion of the system). The influent wastewater may be processed in an aerated or non-aerated lagoon system to remove the majority of the BOD5 and TSS, for example down to approximately 20-45 mg/L. Furthermore, the lagoon system will either nitrify that water naturally or through use of a supplemental nitrification system (e.g., a nitrification reactor), thereby converting ammonia into nitrate. Then, at least some effluent from the lagoon system, prior to any final disinfection as may be necessary, is mixed with a portion of influent water and introduced into the bottom of the lagoon with additional mixing provided, which promotes denitrification.

Suitably, this system utilizes to the fullest extent possible any and all existing infrastructure, while adding the minimal amount of equipment necessary to achieve new discharge requirements. Because the denitrification process does not require that a new treatment cell be built, it is likely to fit into existing lagoon sites without the acquisition of new land. Moreover, due to the minimal footprint requirement and the relatively minimal pumping costs, both the footprint and operating costs are kept to a minimum while achieving effluent discharge levels of <10 mg/L for nitrate. As a result, the lagoon biological process allows lagoon facilities to upgrade their treatment capabilities with significantly reduced capital costs while not significantly increasing operating costs.

BRIEF DESCRIPTION OF THE DRAWING

The advantages and novel features of the invention will become apparent from the following description of the invention in conjunction with the drawing, which is a schematic diagram illustrating how wastewater flows through and is processed in one embodiment of a wastewater treatment facility according to the invention.

EXEMPLARY EMBODIMENT OF THE INVENTION

In this disclosure, the term "lagoon system" will be used as a broad term to refer to wastewater lagoon(s), per se, as well as to downstream processing apparatus such as nitrifying reactors, clarifiers, sterilization reactors, etc. The initial chambers or cells in such systems, by themselves, will be referred to as lagoons.

The present invention provides an approach for new or existing wastewater lagoon systems—either aerated or non-aerated—to cost effectively meet more stringent effluent discharge requirements, including improving treatment of Ammonia, Nitrite+Nitrate, Total Nitrogen, BOD, and TSS. With the inventive approach to treating wastewater, a new or existing lagoon system will be able to accept raw wastewater from either a municipal or industrial source and, through both aerobic and anoxic processes, achieve approximate effluent of 10-20 mg/L BOD/TSS, <1 mg/L Ammonia, and 5-10 mg/L Nitrate or Total Nitrogen without the need to build a fully mechanical treatment system (such as an activated sludge plant).

A lagoon system 10 in accordance with the invention is illustrated in the FIGURE. According to the method implemented via the system 10, first wastewater is supplied via inlet 12 to the wastewater lagoon portion 14, which may consist of one or more lagoon cells 14a, 14b, etc. The initial objective is to reduce BOD and TSS to lower levels in the lagoon portion 14, in order to promote ammonia removal through nitrification.

Research in the field of activated sludge wastewater treatment has demonstrated that the BOD must be sufficiently reduced to eliminate bacterial competition; generally, a BOD level of 20-45 mg/L is ideal. The majority of lagoon systems, if operated according to this method, have the facilities in place to achieve BOD/TSS removal down to 20-45 mg/L at design flow and loadings. Therefore, the inventive system can utilize this pre-existing capability to avoid the need to upgrade the lagoon component if such an upgrade is not otherwise necessary (e.g., for equipment-related reasons).

There are two benefits to this approach. First, in this initial stage, the lagoon portion 14 does not have to be aerated; regardless of whether there is partial-mix, complete-mix, or no aeration, the inventive method can achieve the stricter discharge standards. The only objective is that the new or existing infrastructure is capable of reducing the majority of the BOD/TSS to levels of approximately 20-45 mg/L as the water leaves the lagoon, when operated appropriately. As a result, in instances of an existing non-aerated lagoon or a partial mix aerated lagoon, both equipment and energy costs are saved by not needing to install new aeration equipment. Second, because the inventive method can utilize this existing infrastructure, as opposed to the activated sludge alternative that replaces it, costs are saved on both equipment and infrastructure. Moreover, operation and maintenance costs remain the same for that portion of the system, giving a measure of predictability for future budgeting.

After the wastewater is processed in the lagoon portion 14 so the BOD/TSS is approximately 20-45 mg/L, it is transferred to the nitrification portion 16 of the system, where the substantial majority of ammonia removal via nitrification takes place. This portion 16 may, for example, include a nitrification reactor, which provides an environment for nitrifying bacteria of various art-known species to nitrify and remove ammonia. As is known in the art, nitrification reactors typically include media of various sorts that provide large amounts of surface area on which the nitrifying bacteria can grow, as well as devices such as aerators and/or surface agitators that help maintain high levels of dissolved oxygen in the water. While some (or even all) of the necessary nitrification might be achieved in the lagoon portion 14 during the summer months, in winter, the majority of the ammonia removal likely will occur in the nitrification portion 16 of the system 10.

The system may further include devices (not illustrated) to maintain certain minimum temperatures of the water in the nitrification portion 16 of the system, as per the above-referenced and incorporated U.S. Pat. No. 9,957,176.

Once the water has been partially or completely nitrified—either "naturally" through just biological activity within the lagoon portion 14 of the system or within a separate nitrification portion 16—the water may be ready to discharge. Alternatively, depending on local requirements, the water may go through a clarification stage 18 prior to discharge at outlet 20.

In accordance with the inventive method, once the treated water is ready for discharge but before disinfection (so that the nitrifying and denitrifying bacteria are not killed), a portion of the water that has been nitrified and that is ready for discharge—either after the clarification stage 18, as illustrated, or right after the nitrification portion 16 (not illustrated)—is mixed with a portion of raw, untreated influent water, e.g., as at flow junction 22, and the mixture of treated (i.e., nitrified) product water and raw, untreated water is introduced into the lagoon portion 14 of the system at a lower, anoxic region 24 of one of the lagoon cells, e.g., cell 14a. Furthermore, the mixture of treated and untreated water is introduced into the anoxic region in a manner that promotes dispersion of nitrate throughout the anoxic region in order to promote denitrification, whereby nitrates are converted to nitrogen gas and leave the wastewater. For example, the mixture of wastewater may be introduced using nozzles that are oriented to direct it outwardly and parallel to the bottom of the lagoon cell 14a as illustrated. Additionally, devices such as baffles, perforated partitions, etc. (not illustrated) may be provided to allow water to enter the lower regions of the lagoon cell 14a from above, but otherwise inhibit mixing of water from the anoxic, lower regions of the lagoon cell 14a with more oxygen-rich water in the upper regions of the lagoon cell.

This method is particularly effective at promoting lower Nitrates and Total Nitrogen for several reasons. First, it utilizes water that has been nitrified, at least partially, which makes it higher in nitrates to "feed" the denitrification process. With all or most of the ammonia converted into nitrates, once denitrification is complete there will be less Total Nitrogen. Second, by blending this colder effluent water with warmer influent water, denitrification is promoted because this type of bacteria is more active the warmer the water is. Moreover, the process of blending the effluent with influent water ensures that it is thoroughly mixed, thereby bringing the nitrates in contact with the denitrifying bacteria found naturally in the influent and the carbon source and driving down Dissolved Oxygen, which is important for denitrification to occur. Finally, injecting the mixture into the bottom of the lagoon cell where Dissolved Oxygen tends to be lower and mixing the injected mixture with anoxic water in the lower regions of the lagoon promotes better treatment and helps to limit solids buildup on the bottom—a common problem that occurs when no mixing is present at the influent point.

There are a number of important benefits to this process. First, this method promotes lower effluent BOD, TSS, and Ammonia, as recirculation of treated water provides further opportunity for nitrogen elimination. Second, it requires minimal infrastructure to install the system and can be installed in the vast majority of existing lagoon sites without acquiring land. Finally, it is very easy to operate, as the system requires minimal maintenance and operator input.

It will be appreciated that the above-described embodiment is exemplary only, and various modifications to this embodiment will occur to those having skill in the art. For example, the lagoon cell 14a (i.e., the one that has the anoxic zone specifically formed therein) could be covered. Covering this cell reduces exposure of the water in the cell 14a to ambient air, thereby reducing oxygen content in the water. Additionally, covering this cell blocks sunlight and reduces the formation of algae, thereby also reducing oxygen content in the water by limiting or reducing photosynthesis (which yields oxygen).

Devices such as mixing vanes or vorticity generators, which promote mixing of the recirculated effluent water with the influent water, could be provided in the recirculation pipe, e.g., between the flow junction 22 and the inlet to the lower, anoxic region of the lagoon 14. Additionally, the pipe leading from the flow junction 22 to the lower, anoxic region of the lagoon 14 could be made longer than a shortest-distance length between to two points, to promote lowering of dissolved oxygen in the water. Furthermore, small chambers—e.g., at the junction where the influent water and effluent water are mixed together prior to flowing into the primary lagoon—could be added for de-aeration and growing the bacteria needed prior to going back into the denitrification process.

To minimize the amount of dissolved oxygen and algae that is mixed with the influent water and that is introduced into the lower, anoxic regions of the lagoon, effluent water may be drawn from the bottom of the nitrification reactor 16 or the clarifying stage 18 (or other location from which processed water to be recirculated is obtained).

To promote denitrification, bacteria or carbon sources could be added to the system at suitable locations If there is aeration within the lagoon, then the air could be cycled on and off with timers to promote denitrification.

These and other embodiments are deemed to be within the scope of the following claims.

We claim:

1. A method for treating wastewater, comprising:
   introducing a first stream of raw, untreated wastewater, obtained from a source of raw, untreated wastewater, into a lagoon portion of a wastewater treatment facility and allowing BOD and TSS to be reduced therein;
   allowing nitrification to occur within the wastewater treatment facility;
   mixing at least a portion of water in which nitrification has occurred with a second stream of raw, untreated wastewater, obtained from the source of raw, untreated wastewater, to form a mixture, and
   introducing the mixture into an anoxic region of the lagoon portion and mixing the introduced mixture with anoxic water that is present in the anoxic region to promote denitrification within the anoxic region.

2. The method of claim 1, wherein the mixture is introduced into the anoxic region of the lagoon portion in a manner that promotes dispersion of nitrate throughout the anoxic region.

3. The method of claim 2, wherein the mixture is introduced into the anoxic region of the lagoon portion in a manner that minimizes mixing of water in the anoxic region of the lagoon portion with oxygen-containing water from other regions of the lagoon portion.

4. The method of claim 2, wherein the mixture is introduced into a bottom region of the lagoon portion.

5. The method of claim 1, wherein the nitrification that is allowed to occur occurs in a distinct nitrification reactor, and
   wherein the portion of water in which nitrification has occurred is obtained from a location that is downstream of the nitrification reactor.

6. The method of claim 5, further comprising clarifying in a clarifying vessel water that has been nitrified in the nitrification reactor,
   wherein the portion of water in which nitrification has occurred is obtained from a location that is downstream of the clarifying vessel.

* * * * *